United States Patent [19]

Bleeker

[11] Patent Number: 5,118,337
[45] Date of Patent: Jun. 2, 1992

[54] METHOD FOR PREPARING GRANULAR FERTILIZER FROM MANURE

[75] Inventor: Erik D. J. Bleeker, Epe, Netherlands

[73] Assignee: MeMon B.V., Deventer, Netherlands

[21] Appl. No.: 511,447

[22] Filed: Apr. 20, 1990

[30] Foreign Application Priority Data

Mar. 16, 1990 [NL] Netherlands ............... 9000614

[51] Int. Cl.⁵ ............................................. C05F 3/00
[52] U.S. Cl. ........................................... 71/21; 71/22; 71/64.05; 71/64.06
[58] Field of Search ............... 71/1, 11, 12, 13, 21-26, 71/64.05, 64.06

[56] References Cited

U.S. PATENT DOCUMENTS

| | | | |
|---|---|---|---|
| 2,735,756 | 2/1956 | Farber | 71/23 |
| 3,855,079 | 12/1974 | Greenfield et al. | 203/47 |
| 3,932,166 | 1/1976 | Vigrovich et al. | 71/11 |
| 4,270,974 | 6/1981 | Greenfield et al. | 159/16 S |
| 4,608,120 | 8/1986 | Greenfield et al. | 159/17.1 |

Primary Examiner—Ferris Lander
Attorney, Agent, or Firm—Webb, Burden, Ziesenheim & Webb

[57] ABSTRACT

The invention relates to a method for preparing a granular fertilizer from manure, comprising the steps of:
  i) acidifying the manure;
  ii) dehydrating the acidified manure and evaporating the carrier liquid; and
  iii) forming granules from the fertilizer obtained.

Preferably the manure is acidified using a mixture of nitric acid and sulphuric acid, wherein in the mixture the nitric acid to sulphuric acid ratio is 30-50:70-50. The granulate comprises:

| | |
|---|---|
| $NH_4$—N | 1-3% by weight |
| $NO_3$—N | 1,5-3,5% by weight |
| N-total | 5-9% by weight |
| $P_2O_3$-total | 2-5% by weight |
| $K_2O$-total | 3-10% by weight |

14 Claims, 4 Drawing Sheets

METHOD FOR PREPARING GRANULAR FERTILIZER FROM MANURE

The present invention relates to a method for preparing a granular fertilizer from manure.

In the conversion processes of manure it is important that at much as possible valuable products are separated from the manure. In these conversion processes most attention is paid to the separation of solids from the manure, which solids after drying may be used as a substitute for artificial fertilizer.

A known manure converting process is the so called Promest process, wherein first the manure is fermented in a fermentation installation, in order to produce biogas. Subsequently solids are removed from the manure fermented, which solids form after drying as manure cake a valuable product. Due to the fermentation the manure cake comprises a relative low amount of organic compounds. These organic compounds in combination with the mineral nutrients, nitrogen, phosphorus and potassium, incorporated in the fertilizer result in a positive difference of the fertilizer over artificial fertilizer.

OBJECT OF THE INVENTION

The invention has for its object to provide a fertilizer which is agronomically improved over artificial fertilizer, so that as will be illustrated below the dose of fertilizer, may be reduced to that of artificial fertilizer.

SUMMARY OF THE INVENTION

According to the invention this is obtained in that the method according to the invention for preparing a granular fertilizer from manure, comprises the steps of:
i) acidifying the manure;
ii) dehydrating the acidified manure and evaporating the carrier liquid; and
iii) forming granules from the fertilizer obtained.

DETAILED DESCRIPTION OF THE INVENTION

Figure 1:
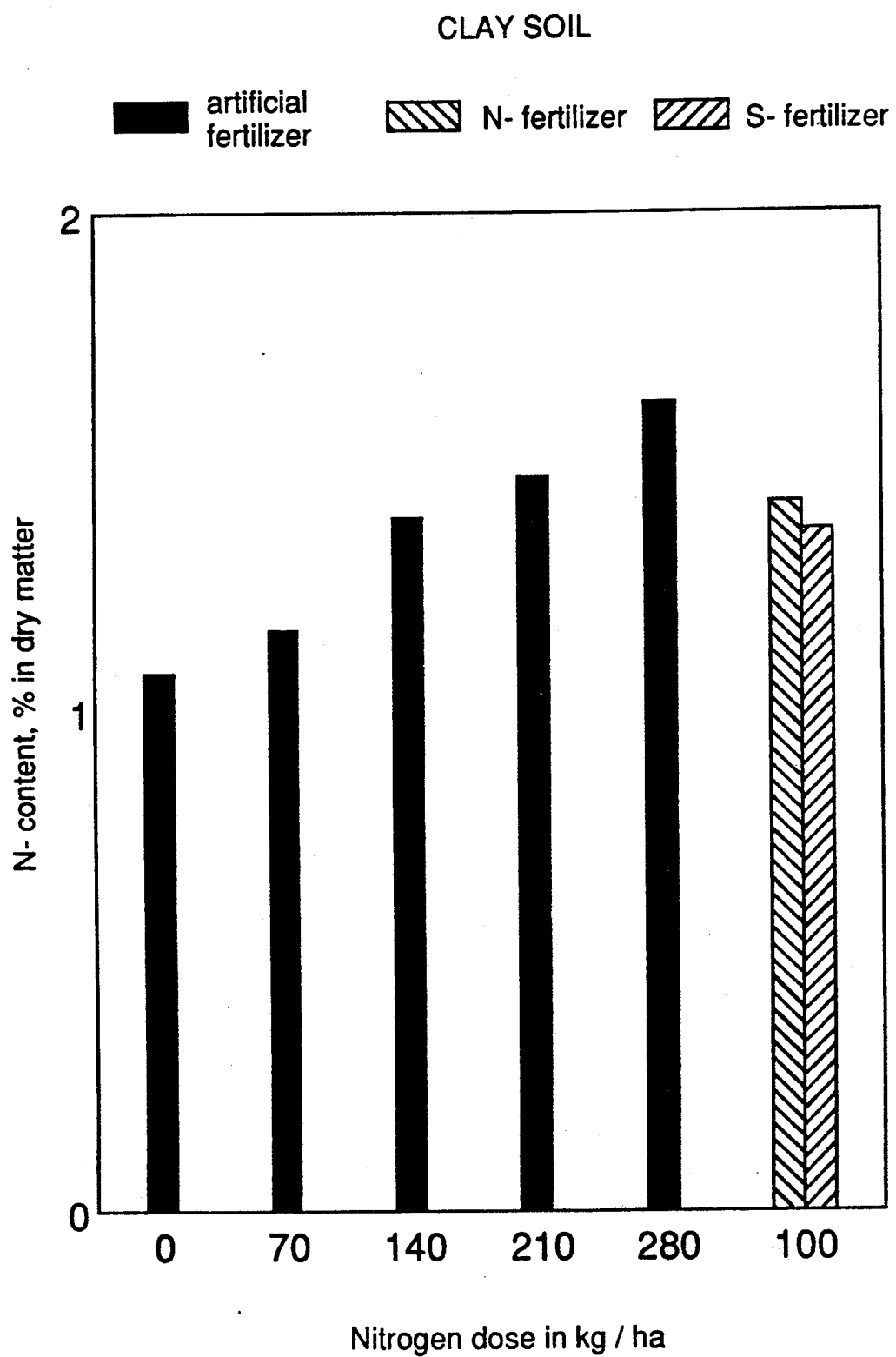
FIGS. 1 and 2 show the results of field experiments on clay soil for the nitrogen content and nitrogen uptake at a nitrogen dose using artificial fertilizer as well as N-fertilizer and S-fertilizer.

According to the invention this is obtained in that the method according to the invention for preparing a granular fertilizer from manure, comprises the steps of:
i) acidifying the manure;
ii) dehydrating the acidified manure and evaporating the carrier liquid; and
iii) forming granules from the fertilizer obtained.

By acidifying the manure, preferably already at the farm, the biological degradation of the organic substances present in the manure, is substantially avoided. Accordingly the fertilizer according to the invention will comprise a relatively high percentage of organic substances, generally more than 30 to 40%, preferably about 50% organic substances. Next to this the emission of ammonia is strongly reduced.

For example the manure may be acidified using nitric acid. But for safety reasons sulphuric acid is preferred, whereby the formation of ammonium nitrate that might be explosive, is avoided. In using sulphuric acid in the acidification the composition of the active nutrients nitrogen, phosphorus and potassium in the fertilizer is 9-3-6. Using sulphuric acid in the acidification, the composition of these active nutrients nitrogen, phosphorus and potassium is 6-3-6. An agronomical study showed, that the fertilizer possess a phosphate effect which is equal to that of artificial fertilizer, whereas the nitrogen effect (mineral and organic nitrogen) is about 70% of that of artificial fertilizer.

Preferably the acidification is carried out using a mixture of nitric acid and sulphuric acid because under particular conditions the acidification using this mixture improves the agronomical value of the fertilizer. For example the acidification may be carried out using a mixture of which the nitric acid to sulphuric acid ratio is 30-50:70-50. More preferably the nitric acid to sulphuric acid ratio is 35-45:65-55.

Dependent on the type of manure and on the solid content of the manure, the amount of acid added is generally sufficient to result in a pH increase of 3.5-5.5, more preferably to 4-5, particularly to 4.1-4.3. Generally the amount of acid added is 1-10% by weight based on the weight of the manure. More preferably the amount added is 1-5% by weight, conventionally 3% by weight.

Additives may be added to the fertilizer in order to adjust the composition of the active nutrients and nitrogen, phosphorus and potassium to the fertilization advice, the additives comprise sulphates, nitrates and potassium salts.

Because usually the fertilizer obtained is in a powder form, it is preferred to granulate the fertilizer. In principle the fertilizer granulates spontaneously, but the granulation may be carried out within narrow granulate-sized distributions when preferably granulation promoting agents are added. These granulation promoting agents comprise for instance chalk, molasses, carboxymethyl cellulose and bentonite. In fact these additives are binders which bind the fertilizer granules to an agglomerate.

In order to avoid the emission of large volumes of air when the agglomerate formed is dried, it is preferred to dry the agglomerate using vacuum cooling. Accordingly it is possible to safe significantly on the amount of air to be discharged, if necessary the air must be purified, but moreover the odour emission is substantially reduced, and the condensation water formed may be purified at relatively low costs prior to discharge.

Preferably the manure is dehydrated according to the so called Greenfield process (U.S. Pat. No. 3,855,079, U.S. Pat. No. 4,270,974 and U.S. Pat. No. 4,608,120). According to this known process a non-volatile oil is added to the manure and the oil slurry formed is dehydrated by evaporation using heat, whereafter the oil is removed from the solids by evaporation at a temperature of 140°-160° C. Due to this high evaporation temperature weed seeds present in the manure are killed, and a sterilization takes place which allows a longterm storage of the fertilizer or fertilizer granules. Another important advantage is that germs containing manure, such as swine fever, may be processed because all germs are killed in the sterilization step.

In this respect it is an additional advantage, that after granulation hair which may be present in the manure may be easily removed by sieving.

The granulate formed has a solid content of more than 80%, preferably more than 85%, more preferably more than 90%. Generally the granulate comprises:

| | |
|---|---|
| $NH_4$—N | 1-3% by weight |
| $NO_3$—N | 1,5-3,5% by weight |
| N-total | 5-9% by weight |
| $P_2O_3$-total | 2-5% by weight |
| $K_2O$-total | 3-10% by weight |

The method according to the invention may be used with many types of manure, such as manure which originates from cattle farm, swine farm, poultry farm and the like. Generally the manure may have a solid content of more than 7%, but the method according to the invention is particularly suitable for manure having a higher solid content, such as preferably at least 10%, and more preferably to more than 14%. Accordingly the advantage is obtained, that in a central manure processing a smaller amount of manure is to be transported. Moreover the addition of acid at the farm results in a remarkably reduced emission of ammonia.

Hereafter the method according to the invention will be illustrated further with reference to an embodiment in which also the agronomical value of the fertilizer prepared is compared to that of artificial fertilizer.

Bulky waste is removed by sieving from swine manure which prior to storage is acidified using nitric acid or a mixture of nitric acid and sulphuric acid (40/60) (w/w), whereby the pH of the manure is lowered to pH 4.2. The manure acidified was mixed with a water insolvable, liquid paraffin having a boiling point of about 180° C. This mixture of manure and paraffin was dehydrated by evaporation. The vapor formed was condensated in a condensor. The concentrated liquid mixture of manure and paraffin was added to a heating vessel, in which at a temperature of about 180°-190° C. the paraffin was removed by evaporation. If necessary remainder paraffin may be removed from the fertilizer obtained by steam stripping. After drying the fertilizer obtainer has a residual moisture content of about 1.5% and a fineness such that about 28% of the fertilizer has a particle size smaller than 100 μm. The bulk weight is about 500 g/l.

Subsequently the fertilizer is granulated. Thereto the fertilizer, if necessary additives and granulation promoting agent are added to a granulation drum, in which the fertilizer is granulated to a granulate having a particle size distribution which very subsequently within 0.5-8 mm.

Subsequently the granulate is sieved in order to remove hair and the like. Finally the granulate is classified.

The granulate formed generally has a moisture content of 25-35%, preferably 32-36%. The temperature of the granulate is dependent on the granulation process used, but for instance lies between 80°-100° C.

Subsequently the granulate is added to a vacuum cooling unit, in which the moisture access is readily evaporated by reducing the pressure to about 20 mBar, and the temperature of the granulate decreases. If the granulate to be dried has a temperature which is not sufficiently high, the granulate may be conditioned by adding an extra amount of steam.

Using this vacuum cooling technique the amount of air necessary for drying the granulate is substantially reduced, whereas the granulate has an optimal abrasion resistance, hardness and capability. It is noted that for a sufficient fast drying of the granulate, it is preferred that the granulate has a diameter which lies between 1 and 8 mm. Finally if necessary, the granulate may be post-dried.

The table below shows a number of granulation experiments using fertilizer which is acidified using a mixture of 40/60 nitric acid/sulphuric acid.

The fertilizer granulates obtained from manure that is acidified with nitric acid (hereafter referred to as fertilizer N) and acidified using a mixture of 40/60 nitric acid/sulphuric acid (hereafter referred to as fertilizer S) are studied for their agronomical value, using artificial fertilizer as a reference.

Table 2 shows the composition of the fertilizer granulates used.

The experiments are performed on clay soil and on sand soil. On clay soil the crop was consumption potatoes and on sand soil the crop was industrial potatoes.

For each type of soil five fertilizers-N-steps were used, which varied from 0 to 280 kg nitrogen/ha pro year. Based on a soil test the fertilization advice for clay soil was 220 kg nitrogen and for sand soil 210 kg nitrogen.

During the growth season the crop showed very rapidly remarkable differences in color. Crop grown on fertilizer products had a color which on average was comparable to crop fertilized with 140 kg nitrogen/ha.

Figure 2:
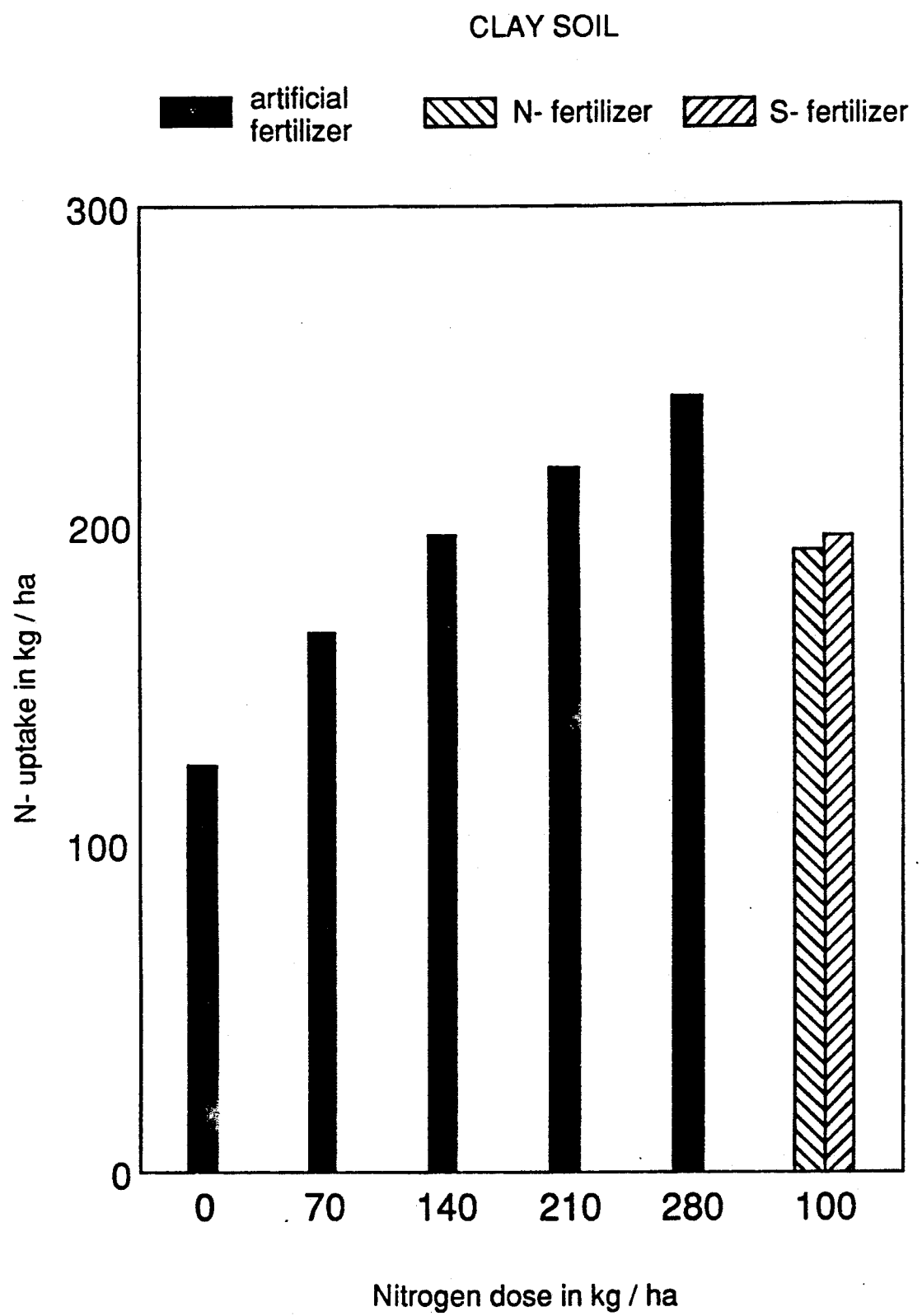
Figure 3:
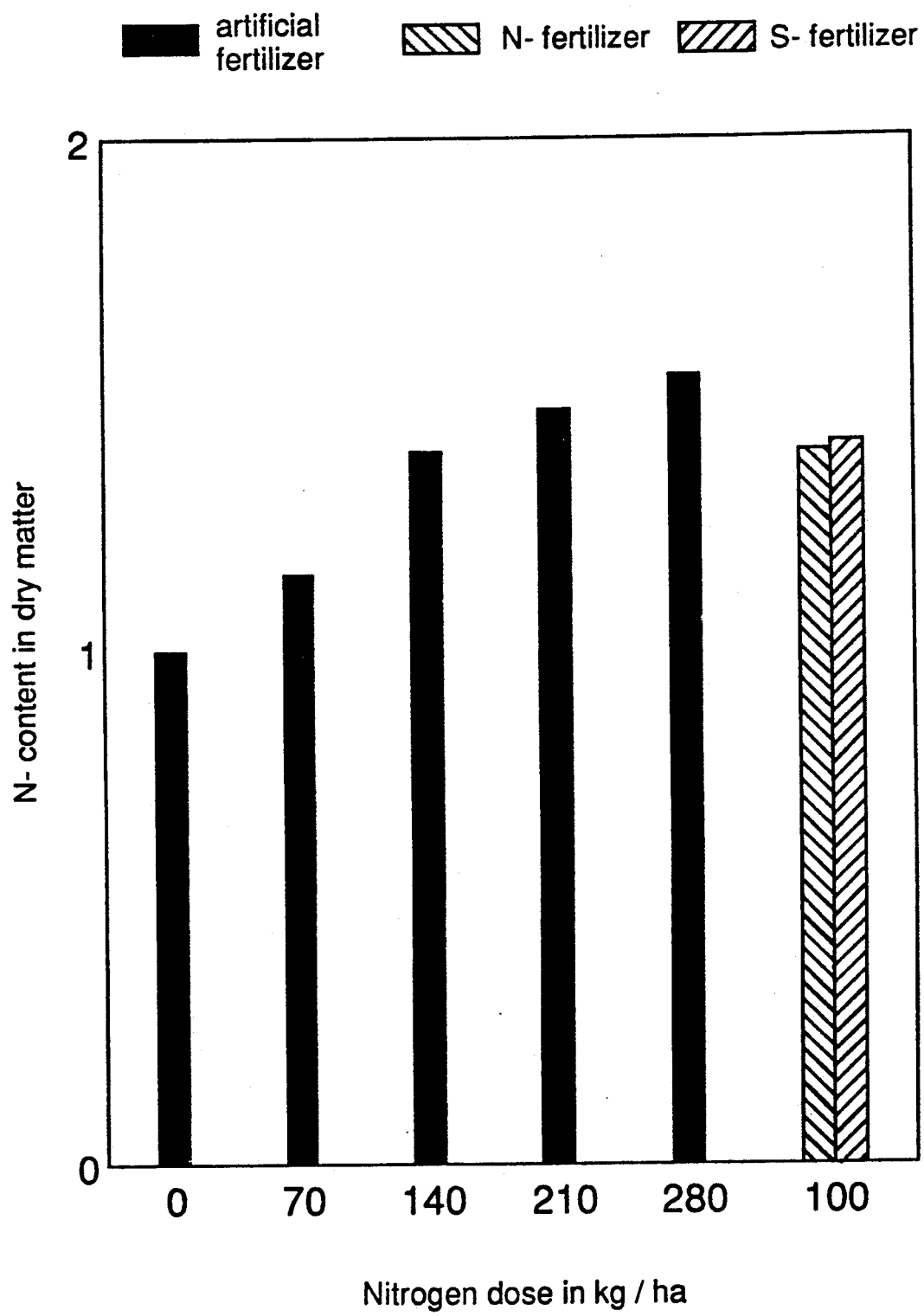
FIGS. 3 and 4 show the results of the same field experiments on sand soil.
Figure 4:
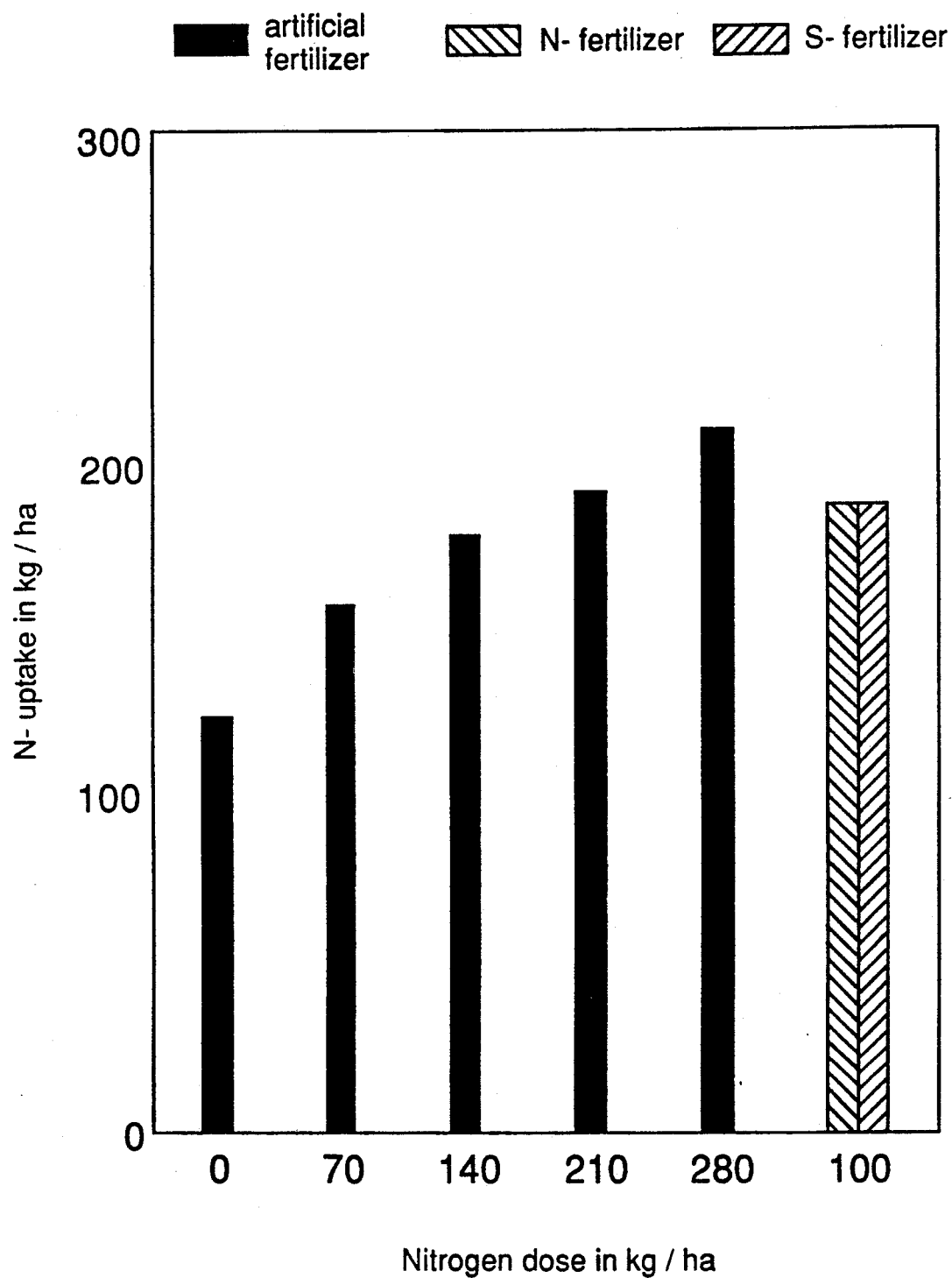

FIGS. 1 and 2 show the results of the field experiments on clay soil for the nitrogen content (in % solids) and nitrogen uptake (in kg/ha) at a nitrogen dose using artificial fertilizer (0–280 kg/ha) and by N-fertilizer and S-fertilizer. The FIGS. 3 and 4 show similar results in field experiments on sand soil.

From these results it is apparent that a mineral nitrogen dose of 100 kg/ha in the form of fertilizer corresponds to a nitrogen dose of 140 kg/ha in the form of artificial fertilizer. Accordingly the mineral load of the soil is lower.

In the experiments on clay soil using consumption potatoes it was apparent that using the N-fertilizer and S-fertilizer the yield of potatoes in ton/ha in comparison to that using artificial fertilizer (59.1 ton/ha) is increased to 42.2 and 67.2 ton/ha, respectively.

For industrial potatoes on sand soil the yield in comparison to that using artificial fertilizer (46.0 ton/ha) is increased to 48.4 en 48.5 ton/ha, respectively. The weight of crop paid for was, in comparison to 67.6 ton/ha using artificial fertilizer, 67.8 and 66.8 ton/ha, respectively.

These experiments further show that nitrogen present in the fertilizer is remarkably active, whereby not only mineral nitrogen but also organic nitrogen is active. This may explain the lower dose of fertilizer according to the invention compared to that of artificial fertilizer, in order to obtain similar yield results.

TABLE 1

| | Fertilizer granulates according to the invention | | | | | | |
|---|---|---|---|---|---|---|---|
| | 0 | 1 | 2 | 3 | 4 | 5 | 6 |
| Fertilizer (kg) | — | 2,5 | 2 | 2 | 25 | 25 | 25 |
| Binder (kg) | — | — | | | — | | |
| chalk 30% $H_2O$ | | | 2,85 | | | | |
| molasse | | | | 1,74 | | | |
| CMC | | | | | | 2 | |
| Bentonite | | | | | | | 2,5 |
| Water (l) | — | 1,4 | 1,23 | 0,87 | 17,5 | 11,2 | 15 |
| Moisture (%) | 1,5 | 32,5 | 36,4 | 32,4 | 31 | 31,4 | 33,2 |
| Granulate distribution (%) | | | | | | | |
| 8 mm | — | — | — | — | 0,9 | — | 6,3 |

TABLE 1-continued

| | Fertilizer granulates according to the invention | | | | | | |
|---|---|---|---|---|---|---|---|
| | 0 | 1 | 2 | 3 | 4 | 5 | 6 |
| 6 mm | — | 1.5 | — | 0.6 | 8 | 3 | 7.7 |
| 5 mm | — | 8 | 0.9 | 1.4 | 19 | 10 | 12 |
| 3 mm | — | 28 | 6.5 | 15 | 39 | 29 | 59 |
| 2 mm | 0.2 | 53 | 42 | 72 | 54 | 75 | 82 |
| 1 mm | 2 | 89 | 93 | 96 | 84 | 84 | 93 |
| 0,5 mm | 22 | 99,3 | 99,1 | 99,4 | 98,5 | 96,3 | 99,1 |
| <0.5 mm | — | 0,7 | 0,9 | 0,6 | 1,5 | 3,7 | 0,9 |
| 0,2 mm | 58 | — | — | — | — | — | — |
| 0,1 mm | 72 | — | — | — | — | — | — |
| <0,1 mm | 27 | — | — | — | — | — | — |

TABLE 2

| Analysis | N-Fertilizer | S-Fertilizer |
|---|---|---|
| Dry matter | 84,3 | 97,2 |
| $NH_4$—N | 1,76 | 2,60 |
| $NO_3$—N | 3,03 | 2,10 |
| N-total | 6,90 | 7,81 |
| $P_2O_5$-total | 2,80 | 3,39 |
| $K_2O$-total | 5,28 | 7,99 |
| Organo-chloropesticides (mg/kg) | <10 | <10 |
| Polychlorobiphenyls (mg/kg) | <10 | <10 |
| Cadmium (mg/kg) | <1 | <1 |
| Chromium (mg/kg) | 39 | 47 |
| Copper (mg/kg) | 225 | 245 |
| Mercury (mg/kg) | 0,1 | 0,1 |
| Nickel (mg/kg) | 21 | 14 |
| Lead (mg/kg) | <10 | <10 |
| Zinc (mg/kg) | 340 | 345 |
| Arsenic (mg/kg) | 1.1 | 0.8 |

I claim:

1. Method for preparing a granular fertilizer from manure, consisting essentially of the steps of:
   i) acidifying the manure by using a mixture of nitric acid and sulfuric acid in the ratio of 30-50:70-50, to achieve a pH of 3.5-5.5 and further to an extent necessary to prevent biological degradation of the organic substances present in the manure, to generate an acidified manure;
   ii) treating the acidified manure with an organic carrier liquid to form a slurry;
   iii) dehydrating said slurry and then evaporating said organic carrier liquid; and
   iv) granulating the material remaining after the slurry is dehydrated and evaporated.

2. Method as claimed in claim 1, wherein the nitric acid to sulfuric acid ratio is 35-45:65-55.

3. Method as claimed in claim 1, wherein 1-10% by weight acid is added to the manure.

4. Method as claimed in claim 3, wherein 1-5% by weight acid is added to the manure.

5. Method as claimed in claim 3, wherein 3% by weight acid is added to the manure.

6. Method as claimed in claim 1, wherein the manure is acidified to a pH of 4-5.

7. Method as claimed in claim 6, wherein the manure is acidified to a pH of 4.1-4.3 shortly after its production.

8. Method as claimed in claim 1, wherein at least one additive selected from the group consisting of sulphates, nitrates and potassium salts is added to the granular fertilizer.

9. Method as claimed in claim 1, wherein at least one granulation promoting agent is added during step iv).

10. Method as claimed in claim 9, wherein said granulation promoting agent is selected from the group consisting of chalk, molasses, carboxymethyl cellulose and bentonite.

11. Method as claimed in claim 1, wherein the dry manure content of the granular fertilizer is more than 80%.

12. Method as claimed in claim 1, wherein the dry manure content of the granular fertilizer is more than 85%.

13. Method as claimed in claim 1, wherein the dry manure content of the granular fertilizer is more than 90%.

14. Method as claimed in claim 1, wherein the granular fertilizer includes the following constituents:

| | |
|---|---|
| $NH_4$—N | 1-3% by weight |
| $NO_3$—N | 1,5-3,5% by weight |
| N-total | 5-9% by weight |
| $P_2O_3$-total | 2-5% by weight |
| $K_2O$-total | 3-10% by weight |

* * * * *